3,516,315
VERTICAL-HORIZONTAL CUTTING DEVICE FOR A SHEET MATERIAL
Hirofumi Suzuki, Osaka-shi, Japan, assignor to Horai Tekko Sho Co., Ltd., Osaka-shi, Japan
Filed Sept. 10, 1968, Ser. No. 758,912
Claims priority, application Japan, June 6, 1968, 43/39,159
Int. Cl. B65h 35/02
U.S. Cl. 83—408                                                    7 Claims

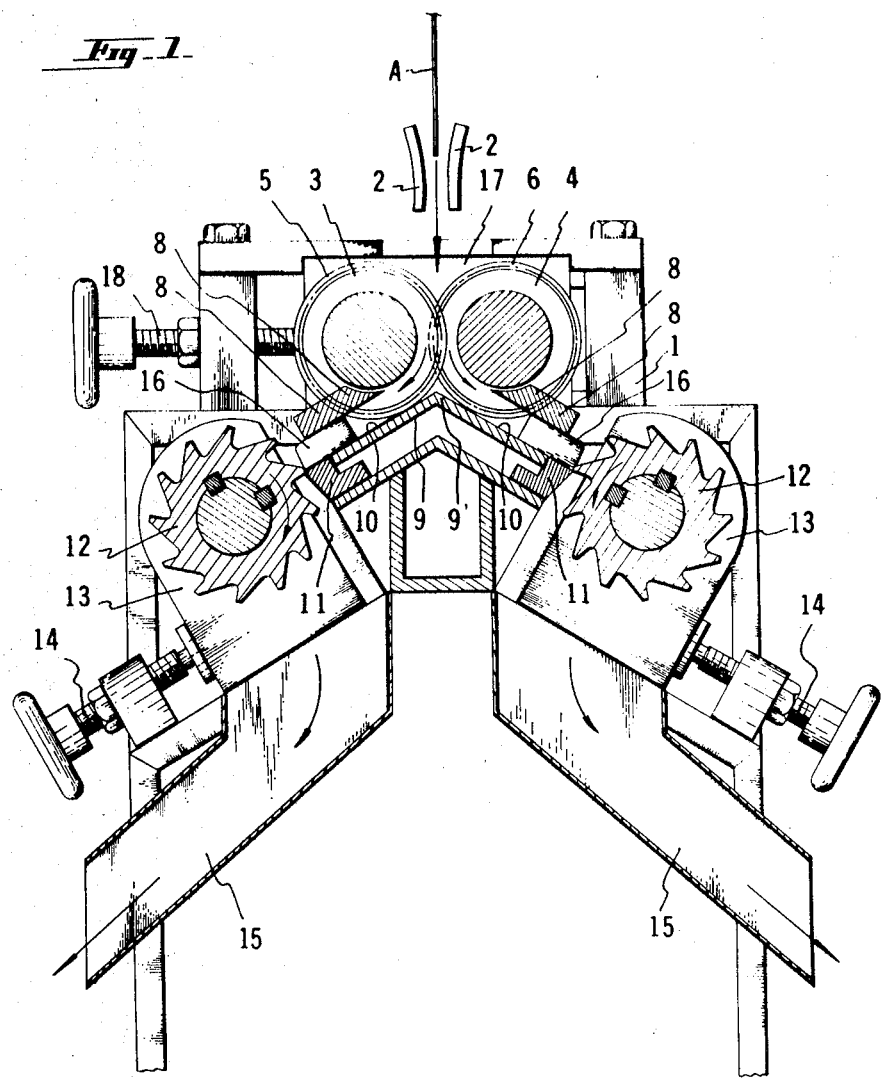

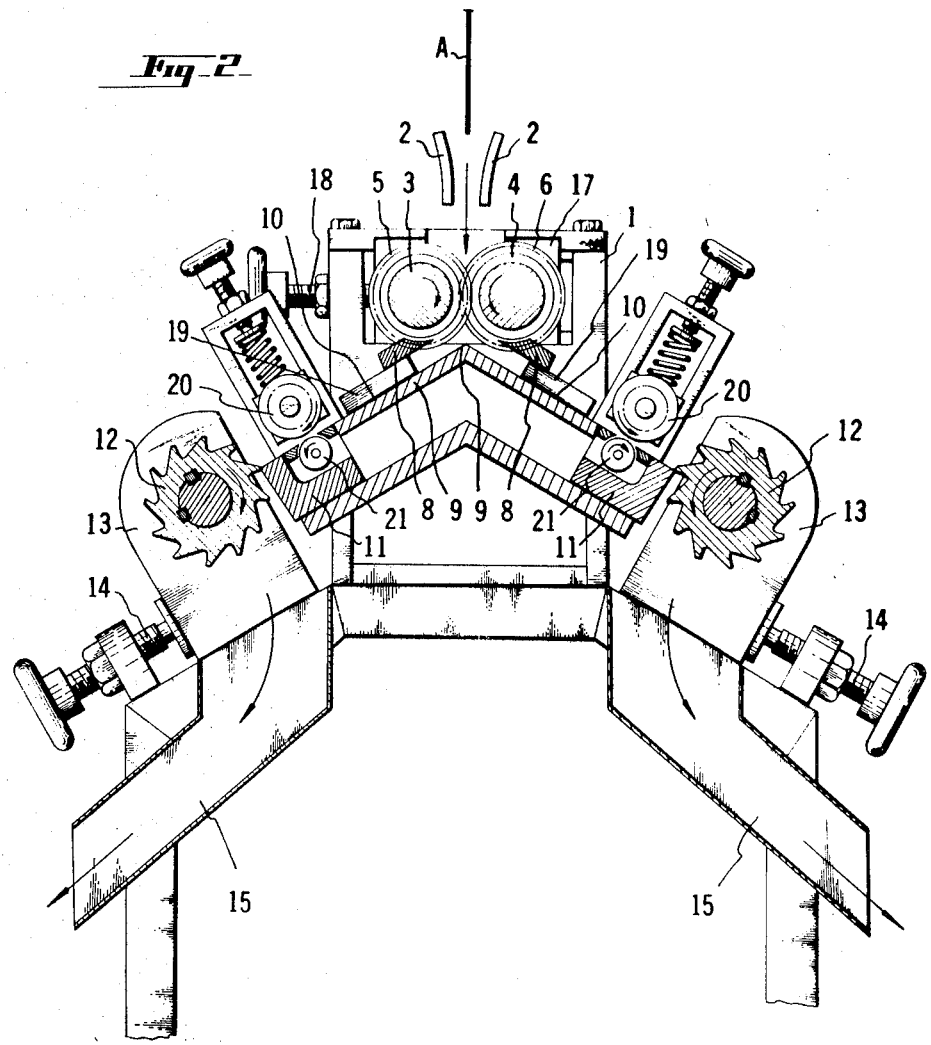

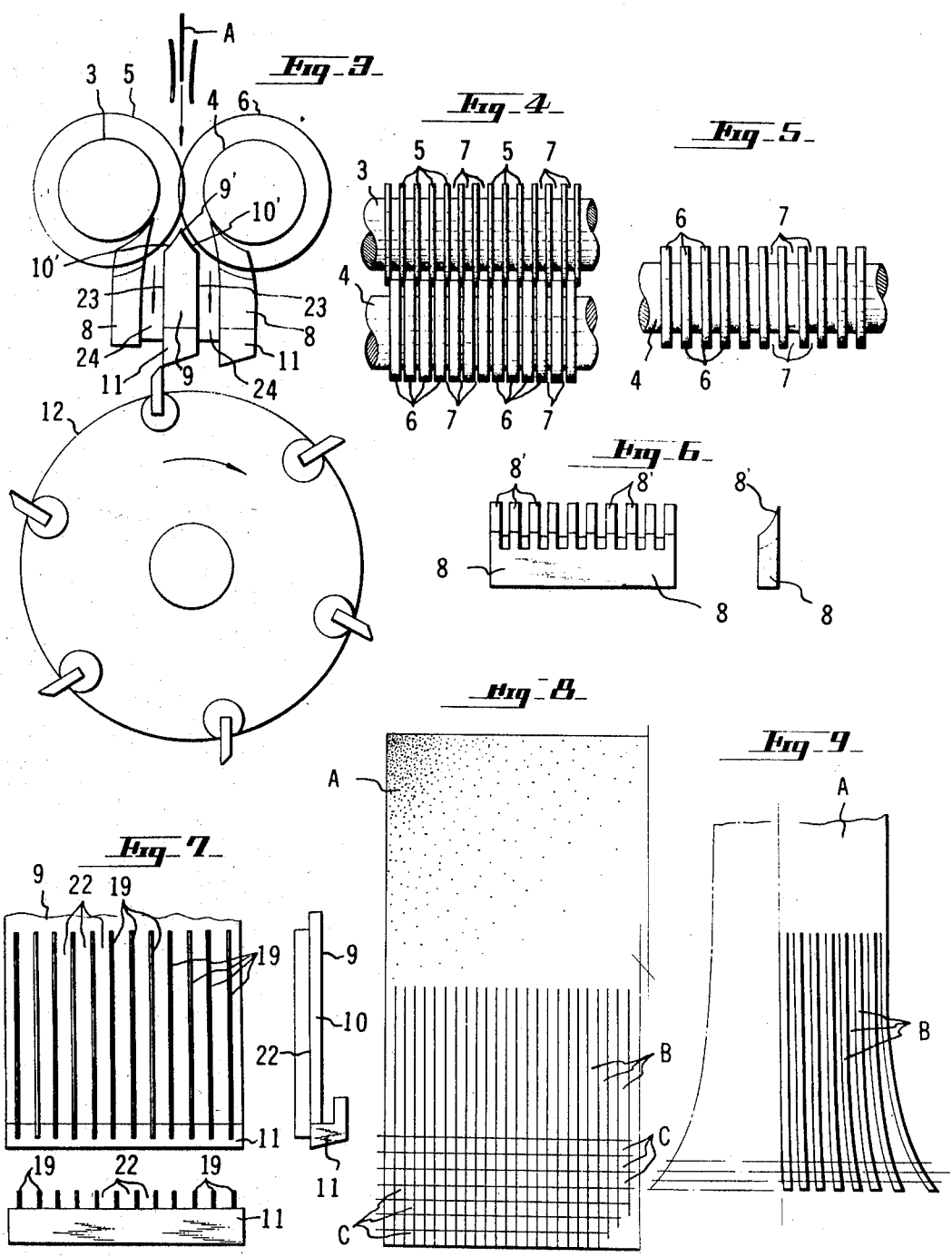

ABSTRACT OF THE DISCLOSURE

This invention is a device for obtaining plastic pellets of uniform configuration with and accuracy from a sheet-shaped material by improvements in the pelletizing mechanism whereby the lengthwise as well as crosswise cutting is effected; comprising a pair of juxtaposed rotary longitudinal roll cutters each having a plurality of spaced annular cutting edges arranged around the periphery so that said annular cutting edges of one roll cutter are dovetailed with the counterparts of the other roll cutter, whereby a sheet material is longitudinally cut into a plurality of strips of a suitable width; pectinate members fitted in the spaces between said cutting edges and provided at the bottom peripheries of said both roll cutters, and a guide element provided as close as possible to the underside of said cutters, whereby a plurality of said strips are parted to right and left alternately, and cross cutters comprising cross-cutting fixed edges and rotary edges provided at both exits of said guide element, whereby the parted strips are cut crosswise.

---

The present invention relates to a device for obtaining plastic pellets of uniform configuration with ease and accuracy from a sheet-shaped material by improvements in the pelletizing mechanism whereby the lengthwise as well as crosswise cutting is effected.

It is known to obtain plastic pellets by longitudinally cutting a plastic sheet material into elongated strips and then cutting crosswise each of these strips into pieces of a predetermined size. This method is extremely efficient and more economical than a strip forming and cutting system according to injection molding. This method, however, has a vital defect that it is apt to produce non-uniformity in size and configuration in the individual pellets, with resultant losses, in porportion as the cutting speed is raised. Namely, according to such method, a sheet material is first longitudinally cut by longitudinal roll cutters into a rattan blind like formation where a plurality of elongated cut strips are arranged in parallel, and when these longitudinally cut and rattan blind-like assembled strips are simultaneosuly cut crosswise by cross cutters, there is produced a peculiar shift deformation on the cut side, which results in generating non-uniformity in shape of the individual cut pellets. Each of said cross cutters is composed of fixed cutting edges and rotary cutting edges and arranged in such manner that, in operation, the rotary cutting edges act on the rattan blind-like material placed on the fixed cutting edges to perform cutting operation in cooperation with the fixed edges. Contact of the rotary cutting edges with the rattan blind-like material is such that the material is struck, as it were, by the cutting edges so that the material is forced to make rolling and twisting motions, with the result that each part of the strips where cutting is being made tends to move in the direction where there is less resistance. It is only natural that, when the material is in a state of being suspended in the direction of gravity, the entire part to be cross cut is spread fan-like in both directions from the center, as for example illustrated in FIG. 9 to be discussed later.

Thus, when these non-uniformly arrayed strips are cut crosswise in a row by cross cutters, the resultant pellets are non-uniform in size and shape, that is, the pieces cut of the strips in the center of the material are differed in size and shape from the pieces cut of the strips at both sides which were spread or twisted. It is thus impossible to obtain correctly and uniformly rectangular or square pieces, and the obtained non-uniform pellets are of no commercial value and rejected as unacceptable articles.

Also, in some cases where certain types of plastic are used, several pieces of strips, because of heat generated during cutting operation, are fused together just after having been cut into strips by longitudinal roll cutters, and if these fused strips are cut crosswise in a row by cross cutters, resultant therefrom are the laterally coupled, elongated pellet pieces which are also commercially valueless, unacceptable articles.

It is therefore the object of the present invention to overcome these difficulties and to provide an improved device for longitudinally and laterally cutting a sheet material to obtain always correct, uniform and excellent plastic pellets at high speed.

In the following will be discussed several fundamental embodiments of the present invention with reference to the accompanying drawings, in which:

FIG. 1 is a longitudinal sectional front view of the device according to the present invention;

FIG. 2 is a longitudinal sectional front view of another embodiment of the present device;

FIG. 3 is a view showing still another embodiment of the present invention;

FIG. 4 is an example of combination of the longitudinal roll cutters;

FIG. 5 is a plane view of a roll cutter;

FIG. 6 is a plane view and a side view of a pectinate member;

FIG. 7 shows arrangement plane of separating guides and principal parts of a fixed cutter;

FIG. 8 is an illustration showing the manner in which a sheet material is cut longitudinally and crosswise; and FIG. 9 is an illustration showing the defects observed when a sheet material is cut by using a conventional device.

Now, the invention will be described in detail with reference to the drawings. FIG. 1 shows a most fundamental embodiment of the present invention. It will be seen that atop the machine frame 1 are provided a pair of guides 2 through which a plastic sheet material A is guided down in the direction of gravity. On the machine frame 1 below said guides 2 are horizontally disposed a pair of rotary longitudinal roll cutters 3, 4 which are adjustably mounted in an opposed relation through an adjustable bearing member 17 and an adjusting screw rod 18. As will be seen in FIGS. 4 and 5, said roll cutters have a plurality of annular, equally spaced cutting edges 5, 6 projected circumferentially on the roll periphery and arranged so that the cutting edges 5 and 6 are engaged together alternately. In this case, the width of the annular cutting edges 5 and 6 on the roll cutters 3 and 4 may be formed equal, or as in the embodiment shown in the drawings, the width of the cutting edges 5 may be made smaller than that of the cutting edges 6. In the former instance where the cutting edges 5 and 6 are of same width, a plurality of longitudinally cut strips from the sheet material A are all same in width, while in the latter instance where the different widths are adopted as in the shown embodiment, the strips of larger width and those of smaller width are formed alternately. Although not shown, the knurlings are formed in the axial direction on the peripheral surface of each of the annular cutting edges 5 and 6. The cutters 3, 4 are arranged to be rotatable in the arrow-marked direction by a suitable driving mechanism not shown. Around the bottom of said cutters 3, 4 are provided pectinate members 8 having a plurality of pectinated teeth 8′ of a curved configuration along the roll periphery as shown in FIG. 6, said pectinated teeth being fitted in the spaces 7 between said cutting edges. The pectinate members 8 are secured with the aid of the machine frame 1 and other elements. It is most preferable that the sharpened ends of said pectinated teeth 8′ along the roll periphery are positioned below the axial center of the roll cutters 3 and 4 as shown in FIGS. 1 to 3. By this arrangement, the strips cut out of a sheet material by the annular cutting edges 5 on the roll cutter 3 are allowed to come into the spaces 7 between the annular cutting edges 6 on the other cutter 4 and attached to the roll surface, while in the same manner the strips cut out of the material by the annular cutting edges 3 on the cutter 4 come into the spaces 7 between the annular cutting edges 5 on the other cutter 3 and are attached to the roll surface, and these attached strips are suitably separated by the pectinated teeth 8′ and in cooperation of a guide 9 provided just below said roll cutters 3, 4, the longitudinally cut strips are parted crosswise to right and left alternately. Said guide 9 is an inverted V-shaped pedestal comprising a pair of bevels 10, 10 of a desired incline slanted both ways from the central apex 9′ and disposed as close as possible to the underside of said roll cutters 3, 4. At the end of each of said bevels 10, 10 of the guide 9, namely at each exit end of the guide 9 is mounted a fixed cross cutter 11, and in front of, and opposed to, said cutter 11 is provided a rotary cutter 12. The fixed cutter 11, of which one example is shown in FIG. 7, has straight cutting edges extending along the full width of the exit of the guide 9. The rotary cutter 12 in this embodiment has a plurality of equally spaced teeth arranged radially on the roll drum. This rotary cutter may be mounted separately on the roll periphery or may be integrally formed or attached on a hollow drum or a frame structure. In FIG. 1, numeral 13 designates bearing members for the rotary cutters 12, 14 adjusting screw rods for adjusting the space with respect to the fixed cutters, and 15 discharge chutes disposed below the position where cross cutting is effected by the fixed cutters 11 and the rotary cutters 12. The shutes 15 may be formed separately or may be combined in one, and the rotary cutters 12 are arranged to be rotated by a suitable driving mechanism. 16 denotes side walls erected on both sides near the exits of the guide 9.

The embodiment shown in FIG. 2 is differed from the one shown in FIG. 1 in that separator walls 19 are arrayed in parallel on each bevel 10 of the guide 9 as shown in FIG. 7, and that draw-out rotors 20, 21 having faster rotating speed than a pair of roll cutters 3, 4 are provided in front of the fixed cutters 11 at the exits of the guide 9. One of said draw-out rotors 20, 21 is rotated in the drawing-out direction to promote smooth drawing out of the strips B which are parted to right and left. In case the guiding path on the guide 9 is long, there are formed guiding passages 22 defined by the separating walls 19 arrayed on each bevel 10, and through each of said passages are guided the strips B; only one strip at one time is passed through each passage in case the material is of mutually adhesive disposition, and in other cases several pieces of strips are passed at one time through each passage. In other respects, the embodiment of FIG. 2 is completely identical to the embodiment of FIG. 1, with the like parts being designated by the like numerical signs. The separating walls 19 are shown erected on the guide 9, but they may be arranged to be suspended from the pectinate members 8. In case of employing the draw-out rotors 20, 21 having the faster rotating speed than the roll cutters 3, 4 as in the embodiment shown in FIG. 2, the separating walls 19 may be unnecessitated.

Unlike the embodiments shown in FIGS. 1 and 2 where the guide 9 has inverted V-shaped bevels for right and life parting purpose, the embodiment shown in FIG. 3, a guide member 9 comprising sharply inclined bevels 10′, 10′ and substantially vertical faces 23, 23 on both sides of the apex 9′. Between the pectinate members 8 and 8 are formed vertical guiding passages 24, 24 through which the parted strips are guided down. At the exits of the passages 24, 24 are provided fixed cutters, 11, 11 and a common rotary cutter 12, said cutters being arranged so that the single rotary cutter 12 will sucessively pass the fixed cutters 11, 11. Said guiding passages 24, 24 may be provided with separating walls 19 thereon.

In practicing the device of the present invention, a plastic sheet material A is fed through the guides 2 into a pair of rotary longitudinal roll cutters 3, 4, whereby the material A is longitudinally cut into a plurality of strips B by the alternately engaged annular cutting edges 5, 6 of said both roll cutters 3, 4 to form a rattan blind-like pattern. In this rattan blind-formed material, the strips B which are hit by the cutting edges 5 are pressed into the spaces 7 on the other roll cutter 4 with which the cutting edges 5 are engaged, while the strips B which are hit by the cutting edges 6 are pressed into the spaces 7 on the opposed roll cutter 3, and the strips B are parted to right and left one at one time alternately. These strips B are separated by the pectinated teeth 8′ of the pectinate members 8 and then further orderly parted to right and left at the central apex 9′ of the guide 9, with the parted strips being slided onto the respective bevels 10, 10 and passed straight along the guide walls toward their exits, so that the strips B on the bevels 10, 10 are all orderly arrayed in a stable state, without producing undesirable shifts and deformations due to rolling or twisting. Thus the strips are also arrayed in a stable contacted state on the fixed cutters 11 provided at the exits of the bevels 10, 10 of the guide 9, so that when they are cut crosswise by the rotary cutters 12, the resultant pieces, or pellets C, are all of uniform shape, size and length. In the embodiment of FIG. 2, the strips B are aligned in an even more stable array by the guiding passages 24 defined by the separating walls 19, thus promoting still more assured formation of uniform pellets. Also, in the embodiment of FIG. 3, although the strips B are here moved vertically in the direction of gravity, they are stably guided by the guide 9 and both side faces of the pectinated teeth 8′ to attain the same effect.

The present invention completely eliminates the defect of producing non-uniform or deformed pellets observed in the conventional vertical-horizontal cutting system and is additionally appraised high for its efficient and high-speed production of always correct, uniform and excellent pellets. Namely, according to the present invention, a sheet material A is cut into a plurality of strips B by a pair of longitudinal roll cutters 3, 4 and these strip pieces B are parted to right and left by utilizing the cutting action. They are further perfectly separated to both sides by the pectinate members 8 and the guide 9 and guided by the cross cutters, whereby it is possible to avoid deflection or twist of the individual strips B due to fan-like spreadout of the strips seen in the conventional devices where rotary cutters are applied perpendicular to the vertically cut rattan blind-like sheet material to effect cross cutting. These strips, while being properly held by the guide 9, are carried orderly to the cross cutter side, so that there is no fear that they are superposed one on the other or forced out of the orderly line since they are sufficiently spaced from each other. Thus, the strips are correctly cut into pieces of same size and same shape by the rotary cutters 12 on the fixed edges 11 of the cross cutters. Resultant therefrom are the excellent pellets having no non-uniformity in size and configuration, with no rejectable articles. It is also possible to provide separating walls 19 on the guide member 9, which permit even more assured stable alignment of the strips. Such provision requires no complex mechanism or driving power therefor, but can be very easily installed. Further, by suitably combining the annular cutting edges 5, 6 of different thicknesses, it is possible to simultaneously obtain two different-sized sorts of pellets from one piece of sheet material A. As will now be obvious, the present invention is a really precious device for obtaining pellets by vertically and horizontally cutting a sheet material. Particularly noticeable in the present invention is that the strip pieces formed by longitudinally cutting a sheet material by longitudinal roll cutters are parted out to right and left, and when separating walls are provided to form guiding passages, it was confirmed that a sheet material having, for instance, a thickness of 3 to 4 mm. and a width of 150 to 200 mm. can be cut at a cutting velocity of 40 to 50 m./min., in contrast with the conventional devices of which the cutting velocity was about 10 m./min., at best. Prominent effect of the present invention is obvious in this respect.

What is claimed is:

1. A vertical-horizontal cutting device for a sheet material, comprising: a pair of juxtaposed rotary longitudinal roll cutters each having a plurality of spaced annular cutting edges arranged around the periphery so that said annular cutting edges of one roll cutter are dovetailed with the counterparts of the other roll cutter, whereby a sheet material is longitudinally cut into a plurality of strips of a suitable width; pectinate members fitted in the spaces between said cutting edges and provided at the bottom peripheries of said both roll cutters, and a guide element provided as close as possible to the underside of said cutters, whereby a plurality of said strips are parted to right and left alternately, and cross cutters comprising cross-cutting fixed edges and rotary edges provided at both exits of said guide element, whereby the parted strips are cut crosswise.

2. A vertical-horizontal cutting device for a sheet material as defined in claim 1, in which partition walls for separating the strips at least one at a time are provided in parallel on the guiding face of the guide element provided as close as possible to the underside of said both roll cutters.

3. A vertical-horizontal cutting device for a sheet material as defined in claim 1, in which the width of the annular cutting edges of one of said roll cutters is different from the width of those of the other roll cutter.

4. A vertical-horizontal cutting device for a sheet material as defined in claim 1, in which a pair of draw-out rotors having a faster rotating speed than said both roll cutters are provided in front of the fixed cutting edges at the exits of said guide element.

5. A vertical-horidontal cutting device for a sheet material as defined in claim 2, in which a pair of draw-out rotors having a faster rotating speed than said both roll cutters are provided between the partition walls on the guide element and the fixed edges.

6. A vertical-horizontal cutting device for a sheet material, comprising: a pair of juxtaposed rotary longitudinal roll cutters having a plurality of spaced annular cutting edges arranged around the periphery so that said cutting edges of one of said roll cutters are dovetailed with the counterparts of the other roll cutter, whereby a sheet material is longitudinally cut into a plurality of strips of a suitable width; pectinate members fitted in the spaces between said edges and provided at the bottom peripheries of said roll cutters; a guide element nib-shaped in section and having an apex on the straight line passing the crossing point of said cutters; steep bevels continuative to said apex and substantially vertical faces continuative to said bevels, said guide being provided below said roll cutters and forming, with said pectinate members, the guiding passages for parting the strips to right and left; and cross cutters each comprising cross-cutting fixed edges and a rotary edge provided at the exits of said guiding passages for cutting the parted strips crosswise.

7. A vertical-horizontal cutting device for a sheet material as defined in claim 6, in which partition walls for separating the strips at least one at a time are provided in parallel on said vertical guiding passages.

References Cited

UNITED STATES PATENTS

| | | | |
|---|---|---|---|
| 1,039,795 | 10/1912 | Pfenninger | 83—408 X |
| 2,978,942 | 4/1961 | Re Casino | 83—408 X |
| 3,217,988 | 11/1965 | Lightfoot et al. | 83—408 X |

FRANK T. YOST, Primary Examiner

U.S. Cl. X.R.

83—105, 156, 448, 906